Patented June 27, 1939

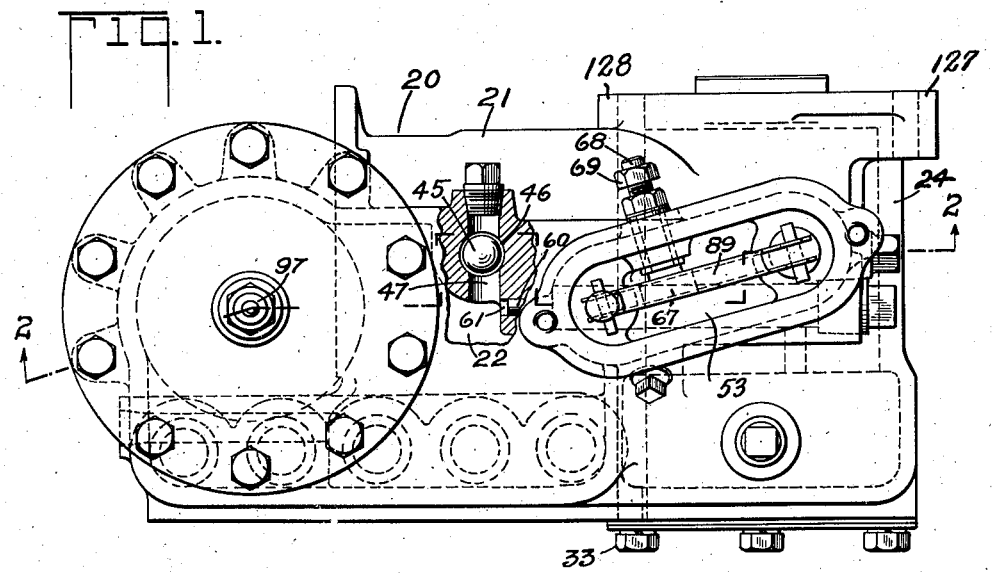
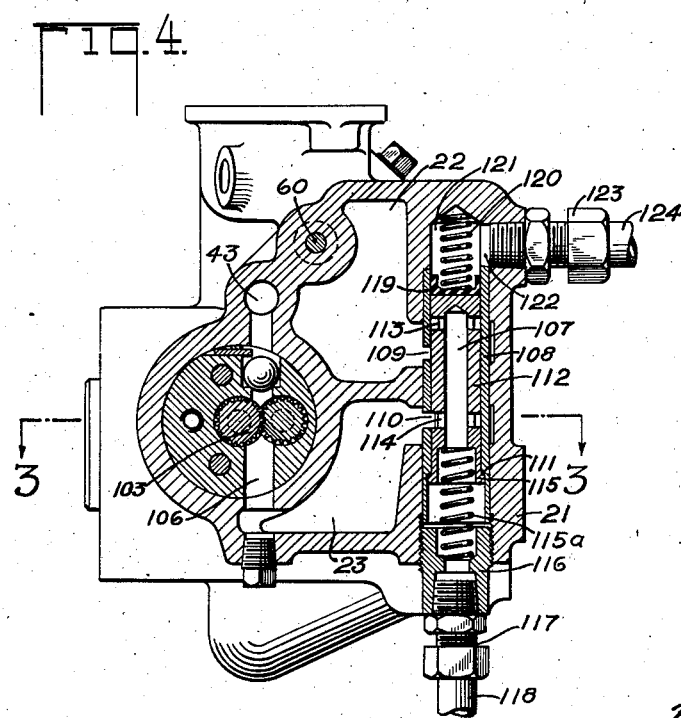

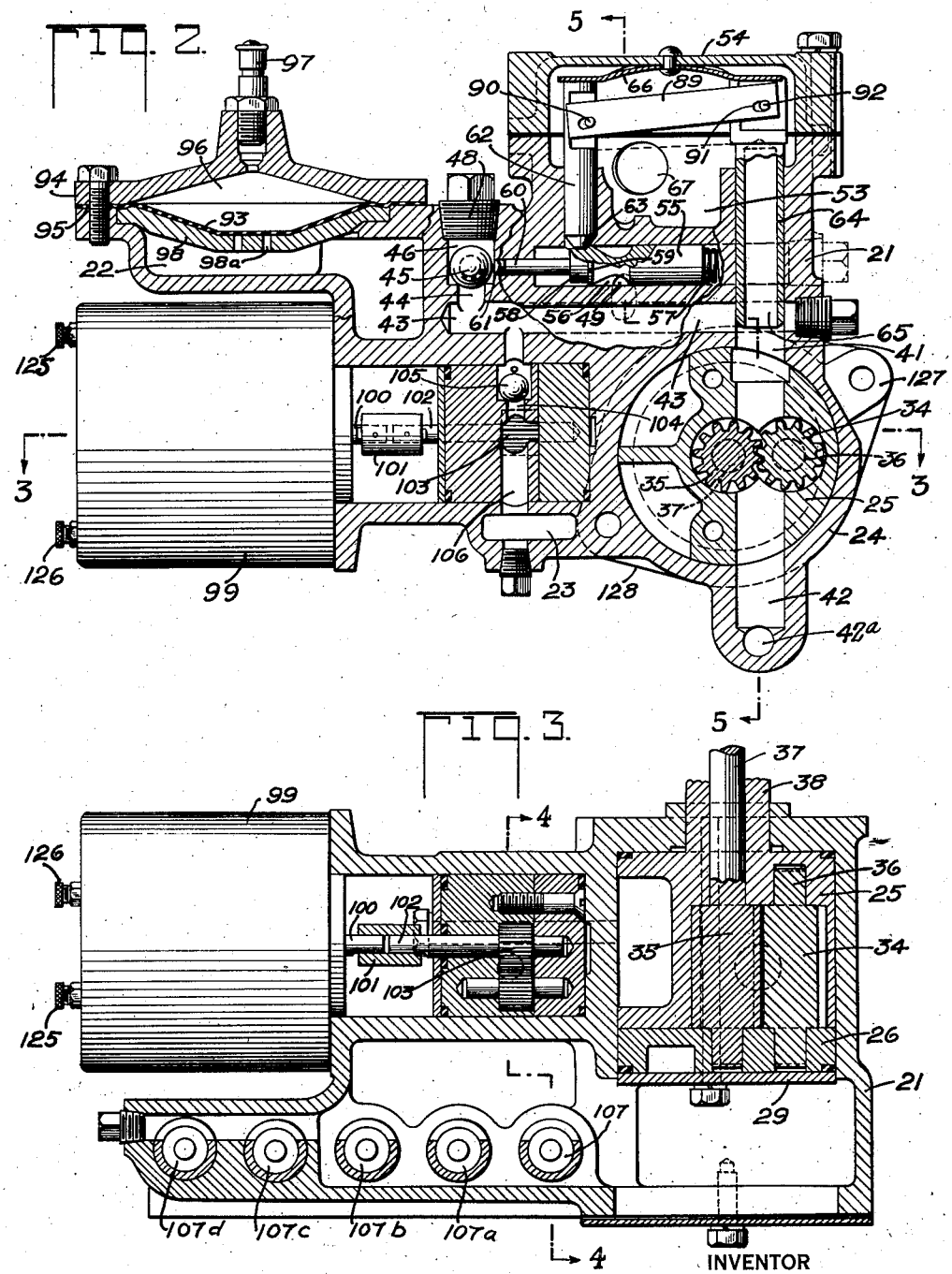

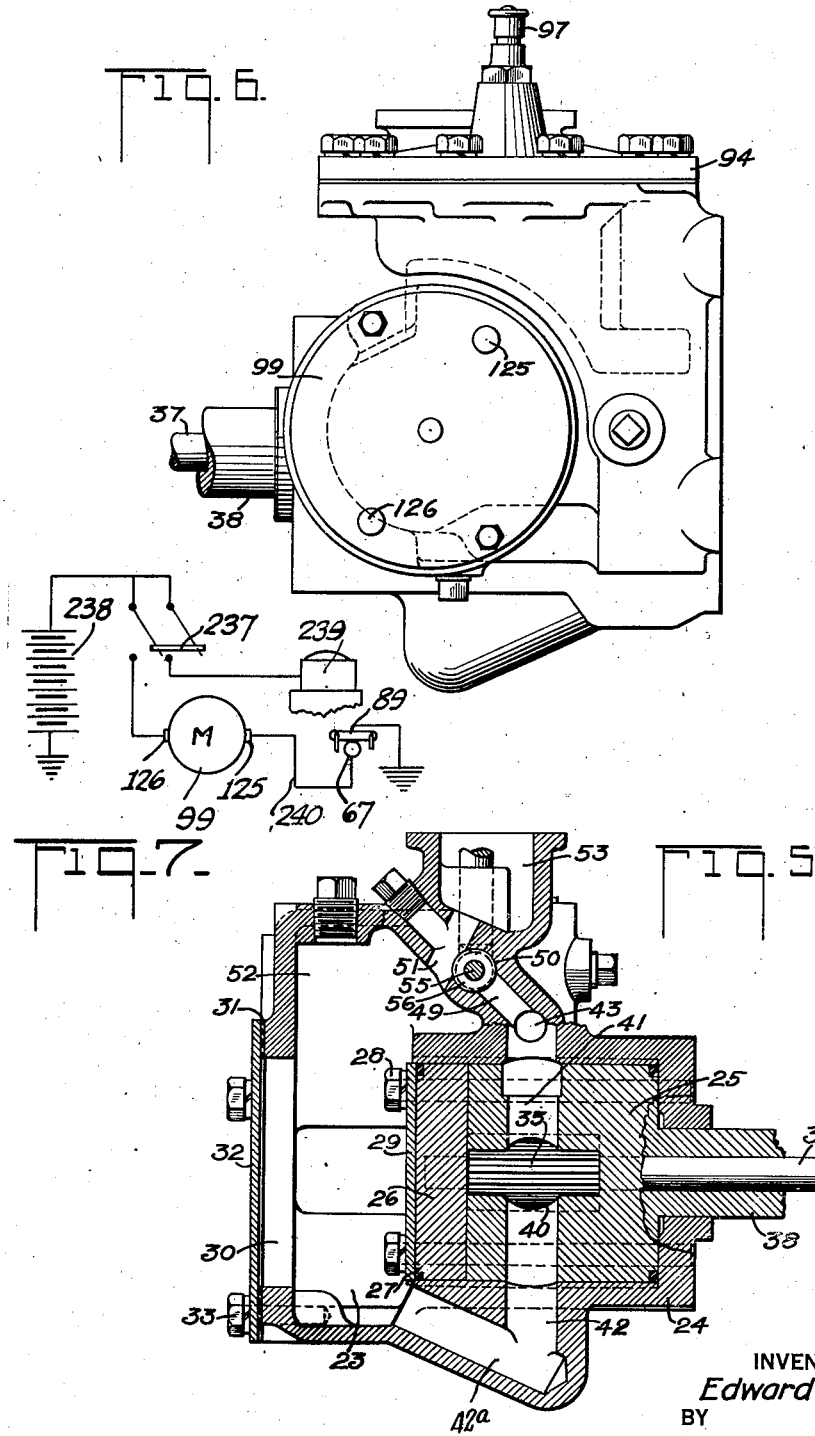

2,163,764

UNITED STATES PATENT OFFICE 2,163,764

FLUID PRESSURE AMPLIFYING DEVICE

Edward A. Rockwell, Chicago, Ill., assignor, by mesne assignments, to General Auto Parts Corporation, a corporation of Delaware Application May 18, 1934, Serial No. 726,426

3 Claims. (Cl. 103—11)

This invention pertains to apparatus for the amplifying of work by fluid pressure power.

It has for an object provision by which the work performed in causing the actuation of the device is amplified by the actuation thereof.

Another object is provision of the above character adapted to the control and actuation of automotive apparatus.

A further object is the provision of a central power station to supply hydraulic fluid under pressure to the various devices to be actuated.

A still further object is the provision of a unit of the above type that automatically maintains the desired pressure.

Another purpose is the provision of a pump adapted to operate continuously but to unload automatically when the desired pressure is reached.

It is further intended to provide two pumps in a single station, one supplementing the other.

Another object is to provide for operation of a main pump by the engine and an automatic secondary pump operable by auxiliary means when the engine is stopped.

A further object of the invention is to provide a hydraulic control means in which pressure is built up to any desired point and automatically trapped and maintained thereat.

A further purpose is the provision of valving control of apparatus remote from the valving means and pressure source.

Fig. 1 is a plan view of combined engine-driven and electric central hydraulic power station.

Fig. 2 is a vertical section of the same along the lines 2—2 in Fig. 1.

Fig. 3 is a horizontal section of the same in the plane of the two pumps taken on line 3—3 of Figs. 2 and 4.

Fig. 4 is a vertical section on the lines 4—4 in Fig. 3.

Fig. 5 is a vertical section on the lines 5—5 in Fig. 2.

Fig. 6 is an end elevation of the unit, and

Fig. 7 is a diagram of the pump motor connections.

Referring to the figures, the numeral 20 generally denotes a central hydraulic power station having a body 21, containing a high pressure chamber 22 and low pressure chamber 23, Fig. 4. A lower cylindrical portion 24 of body 21, Figs. 2 and 5, contains a pump casing 25 and an end plate 26 therefor, fastened together in sealing relation and secured in portion 24 with packing 27 by bolts 28 through an interior cover plate 29. A hand hole 30 in body 21 necessary for the insertion of the pump parts, is closed by a gasket 31 on an exterior plate 32 secured by cap screws 33.

Meshing gear pinions 34 and 35 have integral shafts 36 and 37 both journalled in the pump casing 25 and end plate 26. The shaft 37 protrudes through an extension 38 of casing 25 and is adapted to be engaged in any suitable manner with a rotating part (not shown).

The pinions 34 and 35 together with their shafts and casing as noted, form a gear pump generally denoted by the numeral 40 and having an upwardly extending discharge passage 41 and a downwardly extending inlet passage 42. An inclined passage 42a connects the inlet passage 42 with the low pressure chamber 23.

The numeral 43 denotes a horizontal passage intersecting the discharge passage 41 and leading to an upward hole 44. A ball 45 in a chamber 46 acts as a downwardly closing check valve on the hole 44. A short passage 47, Fig. 1, connects the chamber 46 with the high pressure chamber 22. A plug 48 closes the upper end of chamber 46.

An inclined bypass 49, Fig. 5, intersects a horizontal cylindrical bore 50 and beyond it a second inclined passage 51 connecting an upward bay 52 of the low pressure chamber 23 with an upper switch chamber 53 formed in body 21 completed by a bolted sealing cap 54, said cap 54 being removed in the plan view, Fig. 1.

A piston valve 55, having an annular groove 56 adapted to register with inclined passage 49, is slidable in the bore 50 and is urged to the left (Fig. 2) by a compression spring 57. The piston valve 55 is reduced at 58 leaving a flange 59 between 58 and the annular groove 56.

A reduced extension 60 of piston valve 55 is slidable in sealing relation in a small bore 61 opening into the high pressure chamber 22 as shown in Fig. 1.

A latch plunger 62 slidable vertically in the body 21 and projecting into the switch chamber 53, has a lower point 63 engaging the side of piston valve 55.

The numeral 64 denotes a flow valve piston slidable vertically in discharge passage 41 so as to control the intersection of discharge passage 41 and horizontal passage 43. A bore 65 leads upwardly into piston 64. Piston 64 extends upward into the switch chamber 53.

A leaf spring 66, centrally secured to cap 54 urges plunger 62 and flow valve piston 64 downward.

The numeral 67 Figs. 1 and 2, denotes an electrode insulatedly fixed in the body 21 and having an outward extension 68 provided with a binding nut 69, Fig. 1.

A switch bar 89, which may be of resilient sheet metal having a U-shaped cross section adapted to engage electrode 67 is pivoted to latch plunger 62 at 90 and has a slot 91 engaging a pin 92 in the top of flow valve piston 64.

A flexible diaphragm 93, Fig. 2, is clamped in sealing relation between a circular cap 94 and an annular face 95 of body 21, enclosing a cushion chamber 96 provided with a filler valve 97. A dished member 98 disposed below diaphragm 93 and provided with orifices 98a opening into the high pressure chamber 22, serves to limit the downward flexure of diaphragm 93.

The numeral 99 generally indicates an electric motor secured to body 21 and having a shaft 100 coupled by means of a sleeve 101 to the drive shaft 102 of a gear pump 103. The discharge passage 104 of pump 103 connects through a ball check valve 105 with the horizontal passage 43. An inlet passage 106 of pump 103 opens into the low pressure chamber 23.

The numerals 107, 107a, 107b, 107c and 107d, Fig. 3, generally refer to control or modulating valves of which the valve 107 shown in section in Fig. 4 is typical.

Referring to Fig. 4, a sleeve 108 is tightly held in body 21 and has slots 109 and 110 in communication with the high and low pressure chambers 22 and 23 respectively. Sleeve 108 is provided with an upper internal shoulder 111. A hollow piston 112 slidable in sleeve 108, comprises lateral ports 113 and 114 adapted to register with slots 109 and 110 respectively. Piston 112 is formed with a bottom flange 115 and is urged upward by a spring 115a backed by a bushing 116 threaded into body 21. The bushing 116 receives a pipe or tubing fitting 117 for connecting a pressure supply line 118.

A sealing cup 119 of leather or other suitable material is pressed downward on the top of a piston 112 by a light follower spring 120 in an upper chamber 121. A side opening 122 receives a tubing connector 123 for a control line 124.

The numerals 125 and 126 indicate the binding posts of the motor 99.

The body 21 is provided with lugs 127 and 128 for attachment to the engine, Fig. 1.

Referring to the wiring diagram Fig. 7, the numeral 237 indicates a double pole switch, 238 a battery, 239 the ignition apparatus of the automobile, and 240 a wire connecting the motor terminal 125 with the electrode 67, Fig. 2.

The operation of the device is as follows:

Assuming the hydraulic system to have been initially filled with fluid, the engine being stopped, the cushion chamber 96 is inflated with compressed air through valve 97 to approximately the pressure desired to be maintained in the high pressure chamber 22, thus forcing the diaphragm 93 against the dished backing member 98 as shown in Fig. 2.

The pressure in the chamber 22 being low, the spring 57, Fig. 2, has forced the piston 55 to the left, allowing the point 63 of the plunger 62 to be forced down into the annular groove 56 by gravity and the leaf spring 66. Also since no flow is occurring through the discharge passage 41, the flow valve piston 64 is also allowed to drop. Both plunger 62 and piston 64 being down, the switch bar 89 is in engagement with electrode 67 as shown in broken lines, Fig. 2.

When it is desired to start the engine, the switch 237 Fig. 7 is closed, thus closing parallel circuits through both the ignition apparatus 239 and the pump motor 99. The motor 99 operates the gear pump 103 which draws fluid from the low pressure chamber 23 through the inlet passage 106 and discharges it through the passage 104, past the ball valve 105 to the horizontal passage 43, thence through passage 44 past ball check 45 through chamber 46 and passage 47 to the high pressure chamber 22, raising the pressure therein.

When the engine starts, the gear pump 40 is operated also drawing fluid from low pressure chamber 23 through inclined passage 42a and inlet passage 42, Fig. 2 and discharging through passage 41 to horizontal passage 43 and thence to the high pressure chamber 22 by the course described above. The flow from discharge passage 41 to horizontal passage 43 raises the flow valve piston 64, forcing the switch bar 89 upward out of contact with electrode 67 and breaking the circuit of motor 99. The motor stops and pump 103 stops, but the pump 40 continues to run, being directly connected to the engine.

As the pressure builds up in the high pressure chamber 22 it acts on the end of the reduced extension 60 of piston 55, tending to force the latter to the right against the resistance of the spring 57 and latching plunger 62. When the pressure in 22 has risen to the predetermined maximum point its bearing on the end area of extension 60 forces the piston 55 to the right as shown in Fig. 2, the action occurring with a snap due to the point 63 of latch plunger 62 overrunning the flange 59.

Fluid now passes from the horizontal passage 43 through bypass 49, annular groove 56 and second inclined passage 51 directly to the low pressure chamber 23. The ball 45 in chamber 46 closes the passage 44, trapping the accumulated fluid in the high pressure chamber 22.

The pump 40 continues to run but does practically no work, all fluid being by-passed as described. This condition continues as long as the trapped pressure in chamber 22 and the resistance of the point 63 is sufficient to hold piston 55 to the right. When the pressure in chamber 22 falls to a predetermined point, due for instance to the release of fluid from chamber 22 to a device to be operated, as hereinafter explained, the spring 57 forces flange 59 to raise the plunger 62 and snaps the piston 55 to the left, closing the bypass. The pump now forces fluid past the check ball 45 into high pressure chamber 22 as previously described, until the maximum is again reached and the bypass reopened.

It is seen from the foregoing description that as long as the engine is operating the pump 40 maintains the fluid pressure within predetermined limits in the high pressure chamber 22, pumping just sufficient fluid thereto to make up for that fed to the controlled devices and idling the remainder of the time.

Should the engine stall with the ignition switch on and the piston 55 in pumping position, that is, moved to the left and with plunger point 63 in the annular groove 56, the failure of flow through discharge passage 41 allows the flow valve piston 64 to drop, throwing the switch bar 89 into contact with the electrode 67 to start the motor 99.

The pump 103 now takes up the load, pumping fluid to high pressure chamber 22 either until the engine is restarted or the build up of pressure in chamber 22 throws piston 55 to the right and breaks the motor circuit by raising the plunger 62. It should be noted that raising either plunger 62 or piston 64 breaks the switch and stops the motor.

To summarize, the two pumps cooperate to maintain the desired pressure in the high pressure chamber at all times while the ignition switch is closed, neither pump doing any unnecessary work.

It is obvious that the foregoing process of trapping the high pressure and unloading the pump automatically is highly superior to previous methods of pressure regulation by spring loaded bypasses, etc., in which the pump is under load at all times with large wear, waste of power and heating of the fluid.

The diaphragm 93 and inflated chamber 96, Fig. 2, provide a cushion in the high pressure side of the apparatus, fluctuations in pressure being communicated through the holes 93a to the yielding diaphragm. If the inflation pressure of chamber 96 is made about midway in the differential range of the pressure of chamber 22 the device functions as an accumulator to maintain a smooth action of the high pressure fluid during valve operation and pump loading or unloading.

In the position shown in Fig. 4, the low pressure chamber 23 is in communication with the pressure supply line 118 through the interior of the hollow piston 112, port 114 and slot 110. When a pressure is placed on the fluid in the control line 124, this pressure is transmitted through the tube 124 to the top of the piston 112, forcing the latter downward. This downward motion of the piston 112 first moves the port 114 out of registry with the slot 110, shutting off the low pressure chamber 23. The continued downward motion of the piston 112 brings the port 113 into registry with the slot 109, admitting high fluid pressure to the interior of the hollow piston 112, and thence through the tube 118 for work-performing movement. At the same time the high pressure in the interior and on the bottom of the valve 112 throws 112 upward again so as to close off the high fluid pressure, the build up of high pressure necessary to cause the shut-off depending on the resisting pressure applied through the tube 118. Thus the valve 107 functions to build up a pressure proportional to the applied force and at once shuts off to hold the same pressure so long as the applied force is maintained constant. Release of the pressure above the valve piston 112 moves the valve 112 upwardly to bring the port 114 into registry with the slot 110 and thereby exhausts the pressure from the pipe 118 into the low pressure chamber 23 in proportion to the release of the pressure in the pipe 124.

To summarize the foregoing, the central power plant is adapted to furnish modulated fluid pressure to power actuators, the modulation being effected in proportion to the controlling force exerted on the fluid valves.

While the valve 107 is shown modulated by fluid pressure, it is obvious that it may also be adapted to regulation by direct mechanical linkage.

While the high and low pressure containers of the central power units are generally described as chambers, it is obvious that they may also be pipes without departing from the spirit of the invention. Certain of the appended claims refer to "pressure zones", which are defined as the volume of whatever form in which the noted pressures exist.

Since a number of different devices may be operated from the central power station, each provided with its own modulating control valve, it is evident that the actual pressure supplied to each device is independent of the others, though all are supplied from a common source of trapped pressure. The diaphragm 93 applied to the high pressure chamber 22 gives the latter an accumulated demand capacity.

What is claimed is:

1. In combination with a zone adapted to contain a fluid under pressure, a pump normally operable to deliver fluid to said zone, a second pump adapted to deliver fluid to said zone, means to actuate said second pump, means operable by the operation of said first pump to disable said actuating means, and a device controllable by the pressure in said zone to load and unload said first pump when said first pump is in operation and to control said actuating means when said first pump is stopped.

2. In an automotive vehicle, in combination, a source of fluid pressure comprising a pump operative by the driving mechanism of the vehicle, a switch operative by a change in said fluid pressure, an auxiliary pump, an electric motor operatively connected to said auxiliary pump, a source of electric current, an ignition circuit connection including switching means, and an electric circuit connection between said source of current and said motor including switching means operative conjointly with said ignition switching means and the switch operative by a change of fluid pressure in said source.

3. In a work amplifying device in combination, a motor providing a variable source of power for driving a driven part, variable-speed fluid pumping means having a drive for driving it from the variable source of power of said motor, a second electrically driven fluid pumping means, devices automatically operable for making effective the pumping action of each of said pumping means and accumulating the power thereof, comprising elements forming a demand capacity chamber, and pressure responsive means adapted to insure the operation of said part, controlled by the pressure in said chamber and adapted to make said first pumping means ineffective at a predetermined high pressure and bring into operation said second pumping means, by controlling said device for making effective the second pumping means when the supply by the said first pumping means is insufficient for driving said part.

EDWARD A. ROCKWELL.